J. P. GOLDEN.
SHAFT COUPLING.
APPLICATION FILED JAN. 29, 1909.
934,160. Patented Sept. 14, 1909.
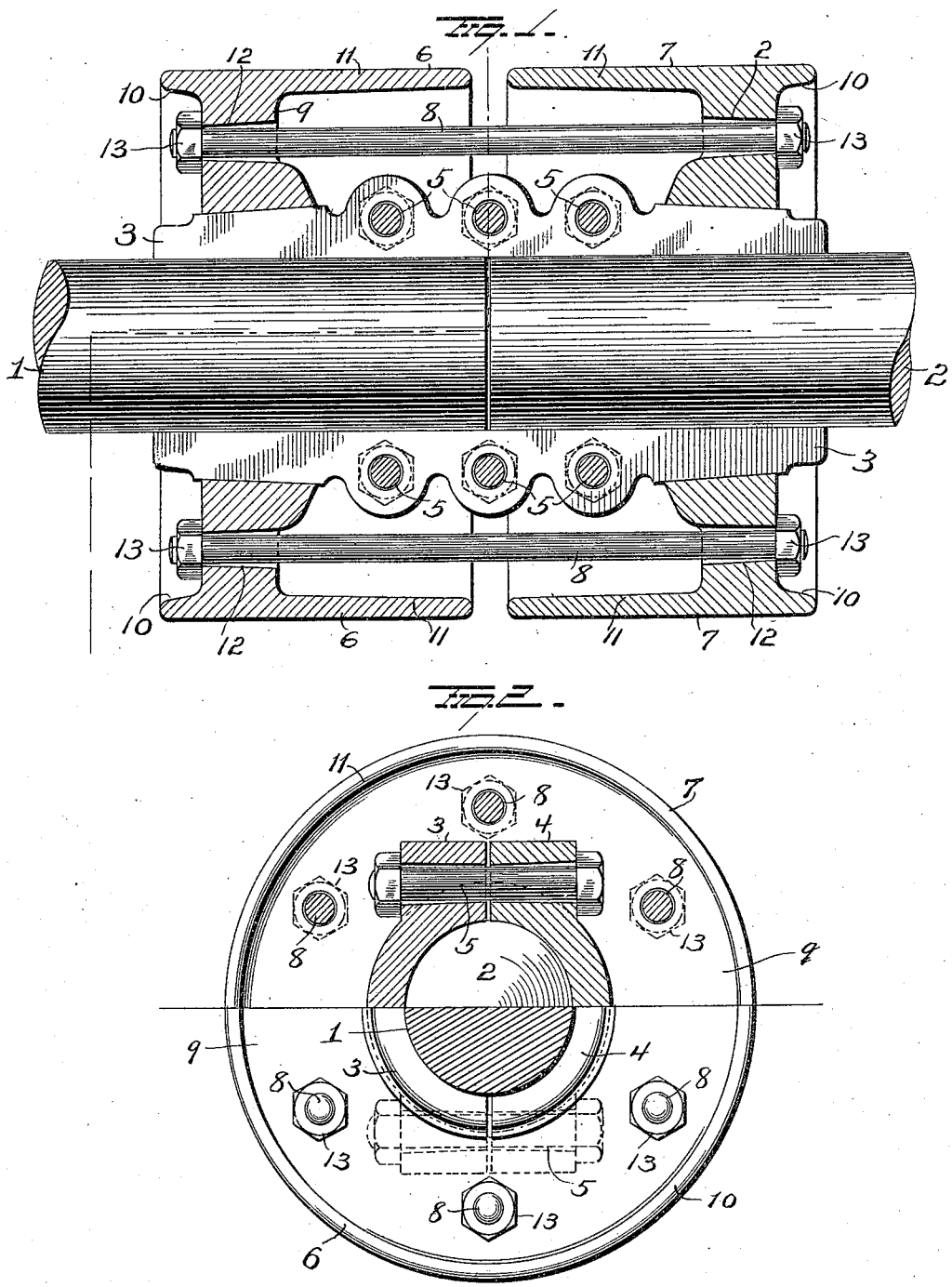

UNITED STATES PATENT OFFICE.

JOHN PORTER GOLDEN, OF COLUMBUS, GEORGIA.

SHAFT-COUPLING.

934,160.

Specification of Letters Patent.

Patented Sept. 14, 1909.

Application filed January 29, 1909. Serial No. 474,959.

*To all whom it may concern:*

Be it known that I, JOHN P. GOLDEN, of Columbus, in the county of Muscogee and State of Georgia, have invented certain new and useful Improvements in Shaft-Couplings; and I do hereby declare the following to be a full, clear, and exact description of the invention, such as will enable others skilled in the art to which it appertains to make and use the same.

This invention relates to improvements in shaft couplings, the object of the invention being to so construct a shaft coupling that it can be readily applied to shaft sections after the latter have been brought together in alinement and which will operate to effectually unite the shaft sections without the use of keys or any device which enters or penetrates the shaft.

A further object is to provide connecting means for shaft sections which shall comprise in a single structure, a compression friction clamp and a cone-friction coupling.

With these objects in view the invention consists in certain novel features of construction and combinations of parts as hereinafter set forth and pointed out in the claim.

In the accompanying drawings, Figure 1 is a longitudinal sectional view, partly in elevation and with one member of the clamping sleeve or box removed, and Fig. 2 is a view partly in transverse section and partly in end elevation.

1, 2, represent alining shaft sections on which a divided clamping box or sleeve is placed, the latter comprising two members 3, 4, having lugs through which bolts 5 are passed. When the two members of the box or sleeve are placed together the bore of the box will be slightly less in diameter than the diameter of the shaft to which the device is to be applied, so that when the box members are placed upon shaft sections, there will be a slight clearance between said members which will permit the latter to be tightly clamped to the shaft sections by the bolts 5. The bolts 5 and the lugs through which they pass are centrally located, two of them being disposed coincident with the meeting ends of the shaft sections and the others located at respective sides of the juncture of the shaft sections.

The divided box or clamping sleeve is made tapering exteriorly at both ends and on these tapering portions, rings 6, 7, having tapering bores are placed. These cone rings comprise web portions 9 and flanges 10—11,—the flanges 11 of the respective rings coöperating to form a shell which incloses most of the intermediate portion of the clamping box and protects the heads and nuts on the bolts 5. The web portions 9 of the cone rings are made with perforations 12 through which long bolts 8 are passed. Each of these bolts is threaded at its respective ends for the reception of nuts 13. When the cone rings have been placed upon the conical portions of the clamping box and the bolts 8 passed through the respective cone rings, the tightening of the nuts 13 will draw the cone rings toward each other so that their conical bores coöperating with the tapering portion of the box will be tightly clamped to the latter and the firm connection of the box to the shaft sections will be assured to such an extent as to prevent possibility of one shaft section turning or moving relatively to the other.

With my improvements a double coupling is produced,—viz., a compression clamp and a cone friction coupling combined. It will also be observed that the lugs and bolt heads and nuts of the box are well protected by the shell formed by the flanges 11 of the cone rings and that the flanges 10 of the latter protect the nuts 13 on the ends of the bolts 8.

Various slight changes might be made in the details of construction of my invention without departing from the spirit thereof or limiting its scope and hence I do not wish to restrict myself to the precise details herein set forth.

Having fully described my invention what I claim as new and desire to secure by Letters-Patent, is,—

In a shaft coupling, the combination of a box or sleeve comprising two members having straight edge portions and tapering end portions, two series of bolts connecting the intermediate portions of the box or sleeve members at diametrically opposite sides for clamping the same to the shaft sections, cone rings located upon the tapering end portions of the box and overhanging the intermediate portions of the latter through which the bolts pass, and bolts connecting said cone rings.

In testimony whereof, I have signed this specification in the presence of two subscribing witnesses.

JOHN PORTER GOLDEN.

Witnesses:
W. B. FORTSON,
T. W. OWEN.